Patented Jan. 17, 1950

2,494,717

UNITED STATES PATENT OFFICE 2,494,717

PEANUT PRODUCTS AND PROCESS FOR PREPARING THE SAME

John T. Owen, Bloomfield, N. J., assignor to Merck & Co., Inc., Rahway, N. J., a corporation of New Jersey No Drawing. Application November 18, 1947, Serial No. 786,787

8 Claims. (Cl. 99—128)

This invention relates generally to improved food products and, more particularly, to improved peanut products stabilized against rancidity, and to methods for their preparation.

It is well known that edible oils and food products containing such oils are susceptible to oxidation. The destructive oxidation caused by exposure to air, moisture, elevated temperatures and the like, results in the formation of volatile products possessing the characteristic odor and taste of rancidity. Thus food products such as peanut butter, peanuts, potato chips and the like deteriorate rapidly when exposed to air due to the formation of undesirable oxidation products. Peanut products containing these oxidation products in an appreciable amount are unsuitable for human consumption.

I have now found that I can retard the rancidity of peanut butter, peanuts, potato chips and the like, by treatment with a salt containing an inhibitor. Particularly suitable inhibitors are ascorbic acid, salts of ascorbic acid, esters of ascorbic acid and the like.

In carrying out the present invention in a preferred manner, ordinary salt (sodium chloride) is mixed with ascorbic acid, ascorbyl palmitate or the like. This salt mixture can then be added to the peanut butter in a suitable proportion. In treating peanuts, potato chips and the like, it is customary to distribute the salt mixture containing ascorbic acid or the like, evenly on the surface of peanuts.

While varying amounts of ascorbic acid can be used, best results are obtained with salt mixtures containing about 5 g. of ascorbic acid per pound of salt. When treating peanut butter with salt mixtures containing ascorbic acid it is desirable to prepare the salt mixture in such a manner that the treated peanut butter will contain approximately 100 mg. of ascorbic acid per pound of peanut butter.

The stability of vegetable cooking oils containing antioxidants can be materially enhanced by the additon of small amounts of ascorbic acid. I have found that ascorbic acid, even if present in very small amounts, as for example, five parts per million will increase the efficiency of propyl gallate and other antioxidants, by providing an acid radical. Vegetable cooking oils containing ascorbic acid in addition to antioxidants are valuable ingredients in the preparation of peanuts and the like.

I have found that peanut butter, peanuts, potato chips and the like, treated in accordance with the present invention will not develop rancidity even after storage for long periods of time. It is therefore possible to prolong the usefulness of these products by a simple and inexpensive procedure.

The following examples illustrate methods of preparing the novel compounds herein disclosed but it is to be understood that these examples are given for purposes of illustration and not of limitation.

Example I 100 milligrams of ascorbic acid was added to one pound of peanut butter by mixing salt with ascorbic acid and incorporating the salt mixture into peanut butter. The treated peanut butter containing 100 mg. of ascorbic acid per pound of peanut butter, was then evenly spread in a Petri dish and placed in an incubator.

Example II 100 milligrams of ascorbyl palmitate was incorporated in one pound of peanut butter in accordance with Example I.

Example III 5 g. of ascorbic acid was mixed with one pound of salt. The resulting salt mixture was evenly distributed on the surface of peanuts which had previously been cooked in oil. The addition of salt was at the rate of 1½-2% based on the weight of the peanuts. The following tests have been conducted for the purpose of determining the keeping qualities of treated peanuts and peanut butter.

Peroxide values

[(Ml. 0.01 N Thiosulfate) /5 gx.]

|  | 38° C. | 50° C. |
|---|---|---|
| 24 DAYS | | |
| Untreated Peanut Butter | 2.7 | 6.5 |
| Peanut Butter Treated (Ascorbic Acid) | 0.0 | 0.0 |
| 38 DAYS | | |
| Untreated Peanut Butter | 3.6 | 4.5 |
| Peanut Butter Treated (Ascorbic Acid) | 0.0 | |
| Peanut Butter Treated (Ascorbyl Palmitate) | 0.0 | |
| 55 DAYS | | |
| Peanut Butter Treated (Ascorbic Acid) | 0.0 | |
| 65 DAYS | | |
| Peanut Butter Treated (Ascorbic Palmitate) | 0.0 | |
| 2 MONTHS | | |
| Peanuts | Organoleptic Test only— no rancidity | |

Various changes and modifications may be made in my process without departing from the spirit and scope of my invention to the extent that these changes and modifications are within the purview of the applicant's claims they are to be considered as part of my invention.

I claim:

1. A peanut preparation stabilized against rancidity comprising peanuts and an external coating of salt containing an inhibitor selected from the group which consists of ascorbic acid, salts of ascorbic acid and esters thereof.

2. A peanut preparation stabilized against rancidity comprising peanuts and an external coating of salt, said salt containing ascorbic acid in an amount of about 5 g. per pound of salt.

3. A peanut preparation stabilized against rancidity comprising peanuts having an external coating of salt in an amount of approximately 2% based on the weight of peanuts, said salt containing an inhibitor selected from the group which consists of ascorbic acid and esters thereof.

4. The method for the preparation of peanut products which comprises preparing a mixture of salt and an inhibitor selected from the group which consists of ascorbic acid, salts of ascorbic acid and esters thereof, and incorporating said salt mixture with the peanut product.

5. The method for the preparation of peanut butter stabilized against rancidity which comprises incorporating a mixture of salt and ascorbic acid with peanut butter, said salt mixture containing a sufficient amount of ascorbic acid to provide 100 mg. of ascorbic acid per pound of peanut butter.

6. The method for the preparation of peanuts stabilized against rancidity which comprises coating peanuts with a salt mixture containing an inhibitor selected from the group which consists of ascorbic acid, salts of ascorbic acid and esters thereof.

7. The method for the preparation of peanuts stabilized against rancidity which comprises coating peanuts with a salt mixture containing about 5 g. of ascorbyl palmitate per pound of salt.

8. The method for the preparation of peanuts stabilized against rancidity which comprises coating peanuts with a salt mixture containing approximately 5 g. of ascorbic acid per pound of salt.

JOHN T. OWEN.

REFERENCES CITED

The following references are of record in the file of this patent:

UNITED STATES PATENTS

| Number | Name | Date |
| --- | --- | --- |
| 1,395,934 | Stockton | Nov. 1, 1921 |
| 2,159,985 | Gray et al. | May 30, 1939 |
| 2,333,656 | Mattill et al. | Nov. 9, 1943 |